US 8,979,119 B2

(12) United States Patent
Suesada et al.

(10) Patent No.: US 8,979,119 B2
(45) Date of Patent: Mar. 17, 2015

(54) VEHICLE SIDE DOOR

(71) Applicant: Honda Motor Co., Ltd, Tokyo (JP)

(72) Inventors: Ryo Suesada, Wako (JP); Kazutaka Imamura, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/947,173

(22) Filed: Jul. 22, 2013

(65) Prior Publication Data

US 2014/0062068 A1    Mar. 6, 2014

(30) Foreign Application Priority Data

Aug. 31, 2012  (JP) ................................. 2012-190919

(51) Int. Cl.
| B60R 21/231 | (2011.01) |
| B60R 21/207 | (2006.01) |
| B60R 21/04  | (2006.01) |
| B60R 21/16  | (2006.01) |

(52) U.S. Cl.
CPC ....... B60R 21/23138 (2013.01); B60R 21/0428 (2013.01); B60R 2021/161 (2013.01)
USPC ...................................... 280/730.2; 280/751

(58) Field of Classification Search
USPC .............................. 280/730.2, 751; 296/146.6
See application file for complete search history.

(56) References Cited

U.S. PATENT DOCUMENTS

| 5,306,066 | A | * | 4/1994 | Saathoff ..................... 296/146.6 |
| 5,324,072 | A | * | 6/1994 | Olson et al. ................. 280/730.2 |
| 5,333,899 | A | * | 8/1994 | Witte ......................... 280/730.2 |
| 5,395,135 | A | * | 3/1995 | Lim et al. ....................... 280/751 |
| 5,482,344 | A | * | 1/1996 | Walker et al. ................. 296/39.1 |
| 5,660,426 | A | * | 8/1997 | Sugimori et al. ........ 296/187.05 |
| 5,749,600 | A | * | 5/1998 | Yamada et al. ................ 280/751 |
| 6,203,096 | B1 | * | 3/2001 | Noda et al. .................. 296/146.6 |
| 6,378,896 | B1 | * | 4/2002 | Sakakida et al. ........... 280/730.2 |
| 6,955,391 | B1 | * | 10/2005 | Peng ......................... 296/146.6 |
| 7,357,444 | B2 | * | 4/2008 | Cowelchuk et al. ...... 296/187.05 |
| 8,033,570 | B2 | * | 10/2011 | Sato et al. .................. 280/730.2 |
| 2004/0124615 | A1 | * | 7/2004 | Tanase et al. .............. 280/730.2 |
| 2007/0029764 | A1 | * | 2/2007 | Ochiai et al. ............... 280/730.2 |
| 2007/0029765 | A1 | * | 2/2007 | Ochiai et al. ............... 280/730.2 |
| 2007/0046000 | A1 | * | 3/2007 | Sato et al. .................. 280/730.2 |
| 2007/0145727 | A1 | * | 6/2007 | Inoue et al. ................. 280/730.2 |
| 2009/0184501 | A1 | * | 7/2009 | Hirotani ..................... 280/730.2 |
| 2011/0012330 | A1 | * | 1/2011 | Sato et al. .................. 280/730.2 |

FOREIGN PATENT DOCUMENTS

| JP | 2010-179820 A | 8/2010 |
| JP | 2011-189843 A | 9/2011 |

* cited by examiner

*Primary Examiner* — Paul N Dickson
*Assistant Examiner* — Barry Gooden, Jr.
(74) *Attorney, Agent, or Firm* — Westerman, Hattori, Daniels & Adrian, LLP

(57) ABSTRACT

A door inner panel includes a front operation opening and a rear operation opening that communicate with the inside of a door main body. A seal portion is formed at an edge of each of the openings. The seal portion allows a hole seal that covers the openings to be attached thereto. In the door inner panel, a first extension portion, a second extension portion, and a third extension portion extend, toward the rear opening, from the lower rear portion of the seal portion formed at the edge of the rear opening. The top ends of the first extension portion, the second extension portion, and the third extension portion are connected together to form a connection portion. A displacement preventing portion is located in the connection portion and prevents displacement of a door trim urged by a side airbag toward the door inner panel.

15 Claims, 9 Drawing Sheets

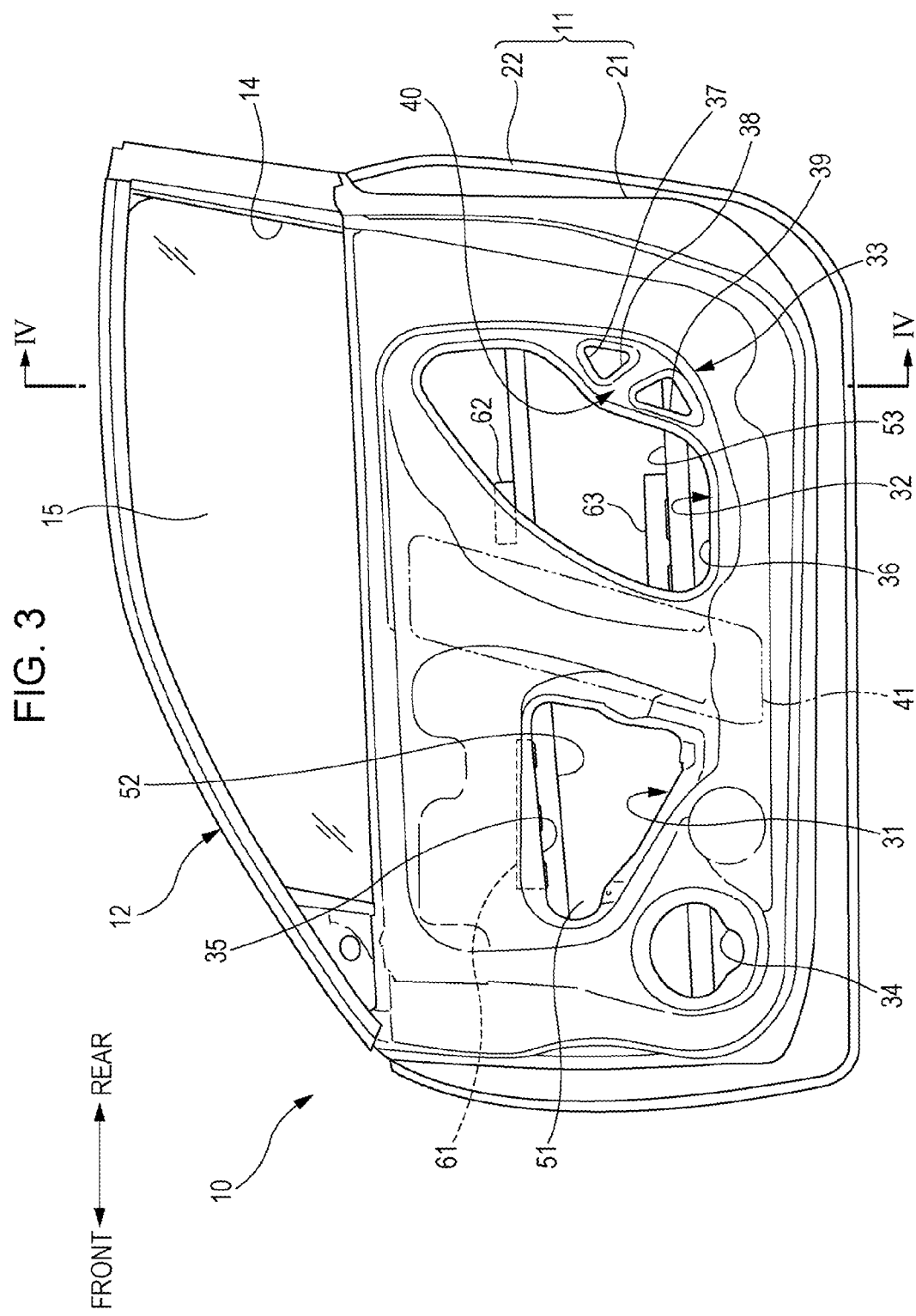

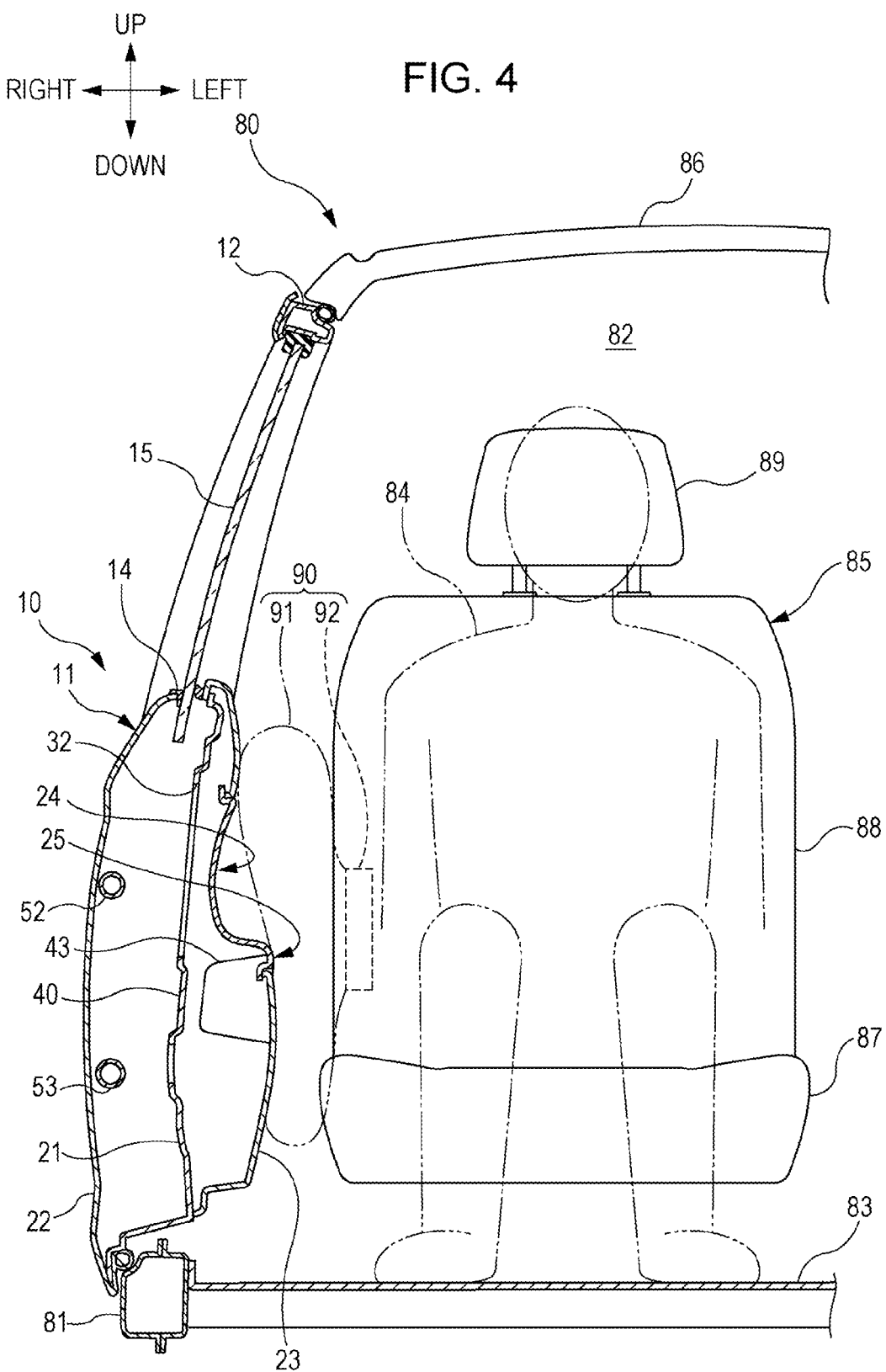

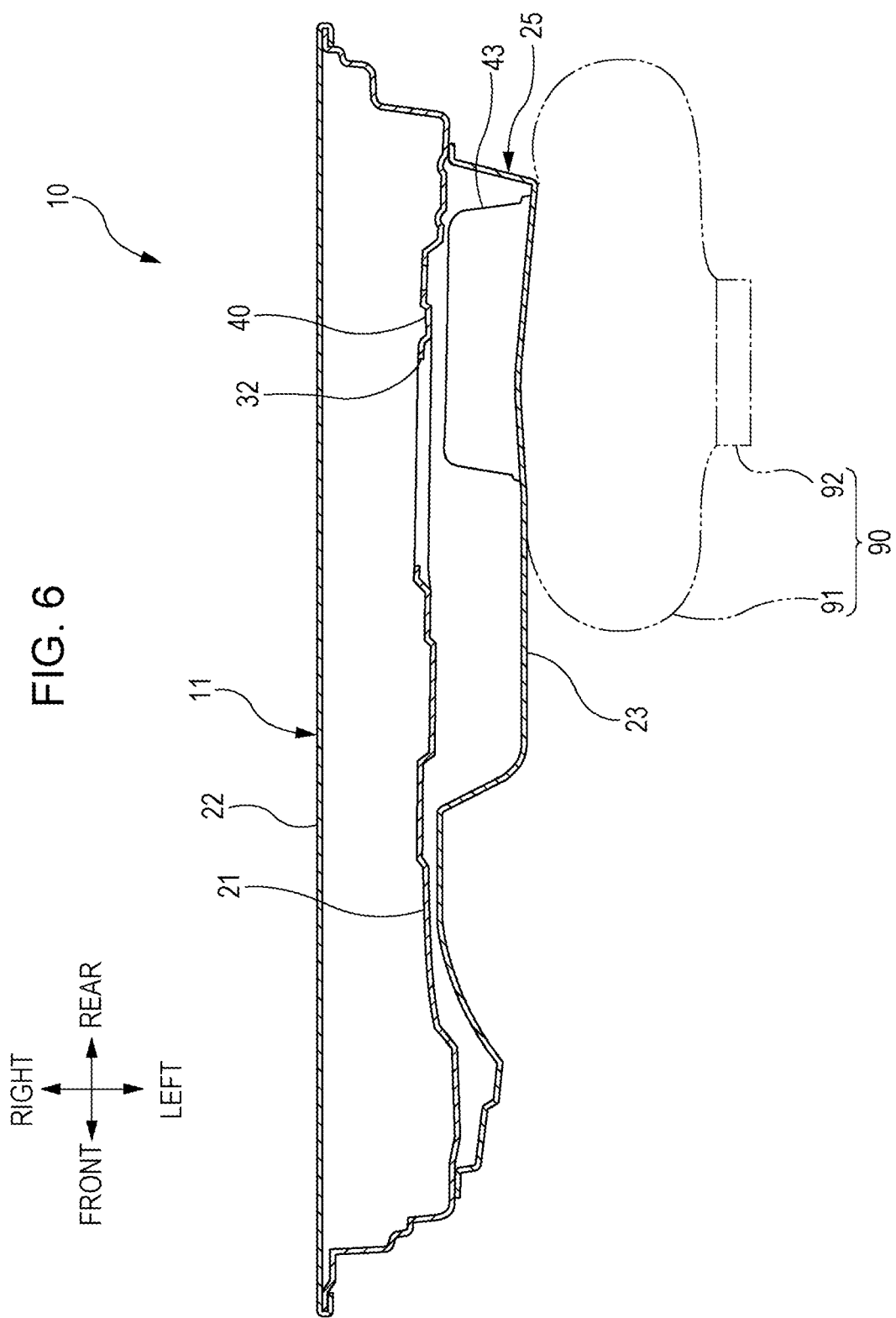

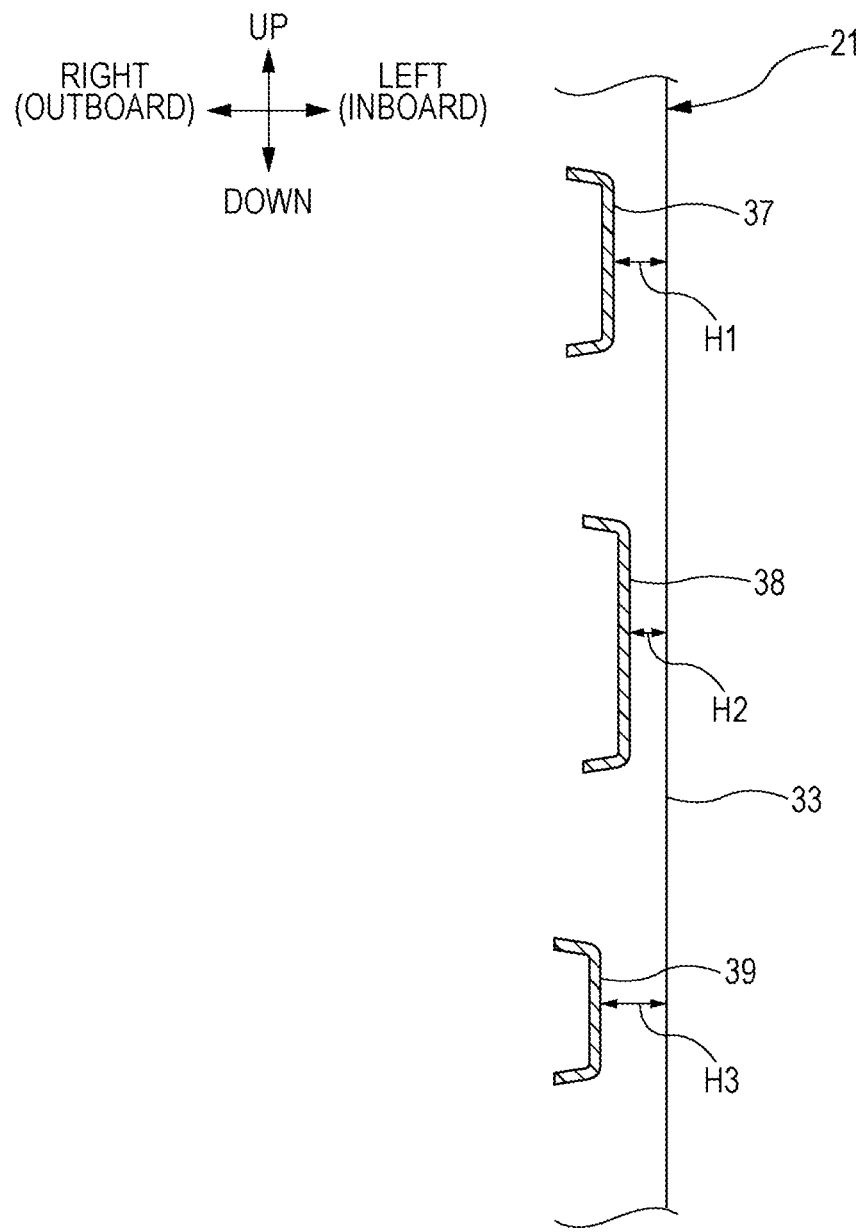

VEHICLE SIDE DOOR

CROSS REFERENCES TO RELATED APPLICATIONS

The present application claims priority under 35 U.S.C. §119 to Japanese Patent Application No. 2012-190919, filed Aug. 31, 2012, entitled "Vehicle Side Door." The contents of this application are incorporated herein by reference in their entirety.

TECHNICAL FIELD

The present disclosure relates to a technology improving a vehicle side door used in a vehicle with a side airbag apparatus.

BACKGROUND

Some ordinary vehicles, such as passenger automobiles, have a side airbag apparatus mounted therein. The side airbag apparatus inflates and deploys a side airbag in the side of a seat. A vehicle having a side airbag apparatus mounted therein is described in, for example, Japanese Unexamined Patent Application Publication No. 2010-179820.

The side airbag apparatus described in Japanese Unexamined Patent Application Publication No. 2010-179820 includes an inflator that supplies gas to a side airbag (hereinafter simply referred to as a "bag") on the side of a seat in a compartment. A side door is disposed on an outboard side of the seat. The side door includes a door outer panel, a door inner panel, and a door trim made of plastic. The door trim includes an article container portion. When a vehicle collides with another object and if the side airbag apparatus operates, gas is supplied from the inflator to the bag and, therefore, the bag is inflated and deployed between the seat and the side door. A blocking member is provided at a point of the article receiving portion with which the bag is brought into contact. Thus, the deployed bag is blocked from entering a recess formed by the article container portion by the blocking member.

However, when the bag is deployed and if the bag is brought into contact with the door trim, a force that urges the door trim outwardly in the vehicle width direction is exerted. If the door trim is deformed outwardly in the vehicle width direction due to such a force, the bag bulges outwardly in the vehicle width direction. Even in such a case, the bag is required to be inflated into a shape that is optimum to protect an occupant. In particular, if a large operation opening used for attaching a window regulator is formed in a door inner panel, it is desirable that the door trim not be deformed and displaced to the inside of the operation opening due to the pressing force at a point of the door trim with which the bag is brought into contact. To more appropriately deploy a bag, further improvement is required.

Accordingly, the present application provides a technology that allows a side airbag to inflate into an optimum deployment shape.

SUMMARY

According to an embodiment of the present disclosure, a vehicle side door mounted on a side of a vehicle includes a door main body including a door inner panel and a door outer panel and a door trim provided to the door inner panel and located on an inboard side of the door inner panel. The door inner panel includes a displacement preventing portion that prevents displacement of the door trim toward the door inner panel. A position of the displacement preventing portion corresponds to a portion from which a side airbag that is deployed between the door trim and an occupant seated in a compartment starts to be in contact with the door trim. According to the embodiment, the door inner panel includes the displacement preventing portion that prevents displacement of the door trim toward the door inner panel. The position of the displacement preventing portion corresponds to a point at which a side airbag that is deployed between the door trim and an occupant seated on a seat in a compartment starts contacting the door trim. Accordingly, displacement of the door trim can be prevented by the displacement preventing portion and, thus, the side airbag can be inflated into a more optimum deployment shape.

It is desirable that the door inner panel include a through hole formed therein, a seal portion formed at an edge of the through hole, and at least one extension portion extending from the seal portion toward the through hole, the through hole allows a functional component disposed inside the door main body to undergo external service operation, and the seal portion allows a hole seal for covering the through hole to be attached thereto. In addition, it is desirable that the displacement preventing portion be provided in the at least one extension portion. In this manner, the seal portion is formed at the edge of the through hole of the door inner panel, and the door inner panel has at least one extension portion extending from the seal portion toward the rear through hole. The extension portion that extends from the seal portion, which serves as a limit line when the size of the through hole is maximized, toward the through hole is provided. In addition, the displacement preventing portion is provided in the extension portion. Thus, the displacement preventing portion can be provided while ensuring a maximized size of the through hole.

It is more desirable that the extension portion slope toward the door outer panel as the extension portion extends from the seal portion toward the through hole. In this manner, in order to cover the through hole, a sheet seal member is bonded to the seal portion. The extension portion slopes toward the door outer panel as it extends from the seal portion toward the through hole. Accordingly, the extension portion is positioned further away from the seal member as it extends from the seal portion toward the through hole. Thus, interference of the extension portion with the seal member can be prevented.

It is more desirable that top ends of a plurality of the extension portions be connected together to form a connection portion, and the displacement preventing portion be located in the connection portion. In this manner, the displacement preventing portion is located in the connection portion formed by connecting the top ends of the extension portions together. Accordingly, the rigidity of the displacement preventing portion can be increased. As a result, displacement of the door trim can be prevented. In addition, since the plurality of extension portions are provided, the width of each of the extension portions can be reduced while maintaining a predetermined rigidity of the displacement preventing portion. As a result, the weight of each of the extension portions can be reduced and, therefore, the weight of the door inner panel can be reduced.

It is more desirable that base ends of a plurality of the extension portions be located at different heights from the seal portion in a door thickness direction. In this manner, if the side air bag is inflated and deployed and, thus, the side air bag is brought into contact with the door trim, the load is applied to the displacement preventing portion located in the top ends of the extension portions urging outwardly in the vehicle width direction. At that time, a bending moment about the connection portion between the seal portion and each of the extension portions is generated in the extension portions. Since the base ends of the extension portions are located at the different heights from the seal portion in the door thickness direction, the rotation centers of the bending moments of the respective extension portions can be made different from each other. Thus, the extension portions may be resistant to deformation from the rotation centers of the bending moments of the extension portions.

It is more desirable that the vehicle side door further include an impact absorbing member disposed between the door inner panel and the door trim. A position of the impact absorbing member can be determined so as to at least partially overlap the displacement preventing portion when viewed from the door thickness direction. In this manner, the impact absorbing member is disposed in a gap formed between the door inner panel and the door trim and, thus, the gap is filled with the impact absorbing member. The position of the impact absorbing member is determined so as to at least partially overlap the displacement preventing portion when viewed from the door thickness direction. If the side air bag is brought into contact with the door trim, the door trim can be immediately supported by the displacement preventing portion via the impact absorbing member. As a result, deformation of the door trim is reduced and, therefore, the side air bag can be inflated and deployed into an optimum shape.

It is more desirable that the door trim include an arm rest that bulges out from an inboard side of the door trim in a direction away from the door inner panel, and the impact absorbing member be disposed inside the arm rest. In this manner, the door trim includes the arm rest that budges from the inboard surface in a direction away from the door inner panel. Since the arm rest contains the impact absorbing member, deformation of the arm rest that receives a pressing force from the side air bag being inflated and deployed can be prevented. As a result, the side air bag can be more effectively inflated and deployed into an optimum shape.

BRIEF DESCRIPTION OF THE DRAWINGS

The advantages of the disclosure will become apparent in the following description taken in conjunction with the following drawings.

FIG. 3 illustrates the vehicle side door illustrated in FIG. 2 with a door trim removed.

FIG. 4 is a cross-sectional view of a vehicle including the vehicle side door according to the present disclosure, taken along a line IV-IV of FIG. 3.

FIG. 6 is a cross-sectional view taken along a line VI-VI of FIG. 2.

FIG. 9 illustrates the heights of base ends of extension portions from a seal portion of the vehicle side door illustrated in FIG. 8.

DETAILED DESCRIPTION

Exemplary embodiments of the present disclosure are described below with reference to the accompanying drawings.

Exemplary Embodiments

Figure 1:
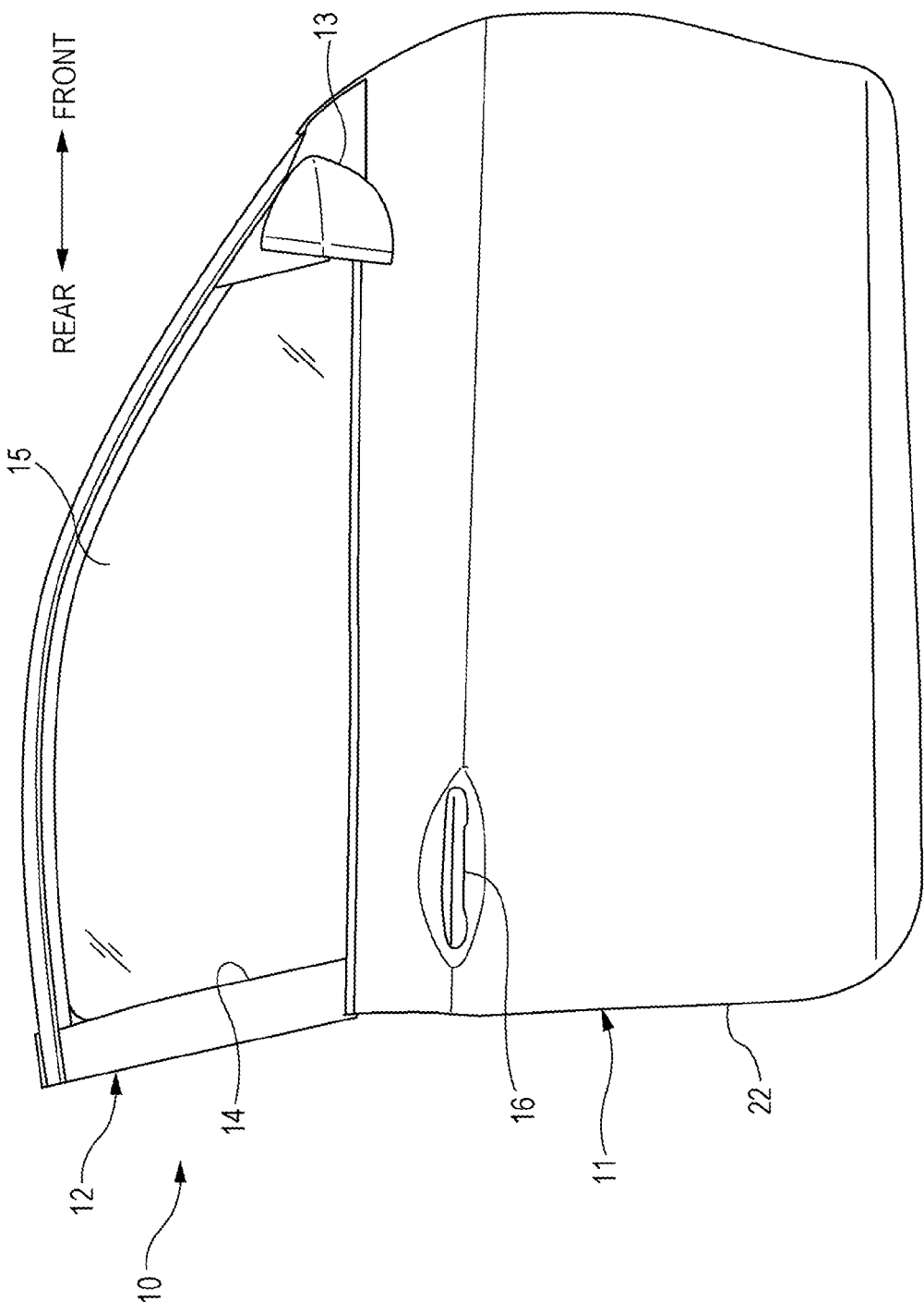
FIG. 1 is a side view showing an outboard side of a vehicle side door according to the present disclosure.

As illustrated in FIG. 1, a vehicle side door 10 is a hinged door disposed on the side of a vehicle adjacent to a driver's seat. The vehicle side door 10 includes a door main body 11 and a door sash 12 disposed on top of the door main body 11.

In addition, a door mirror 13 is provided at the corner formed between the upper front of the door main body 11 and the lower front of the door sash 12. Door glass 15 is disposed in a window opening 14 bounded by the door sash 12 and the upper edge of the door main body 11. The door main body 11 opens and closes the window opening 14. An outer handle 16 is attached to the upper rear portion of the door main body 11.

Figure 2:
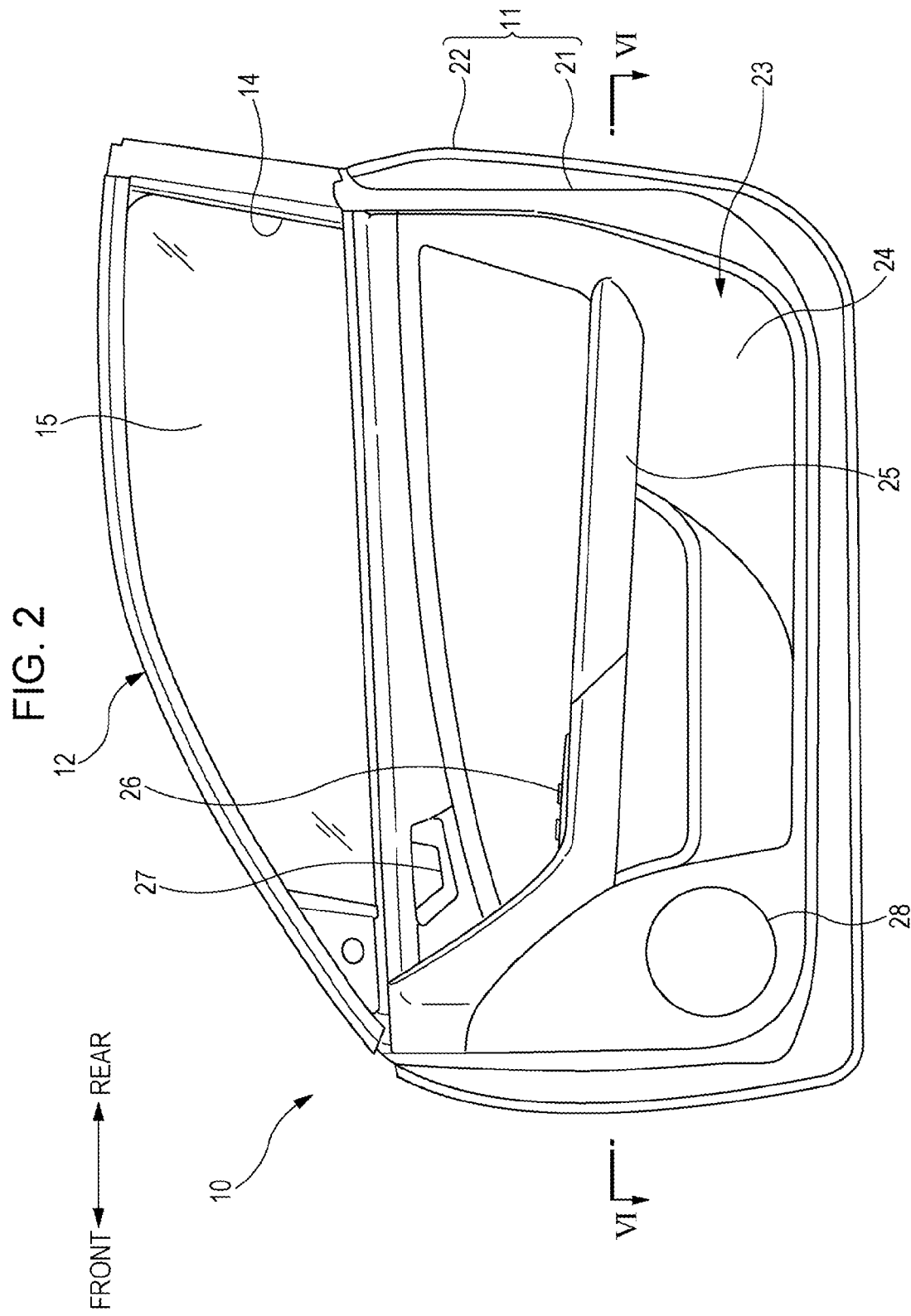
FIG. 2 is a side view showing an inboard side of the vehicle side door illustrated in FIG. 1.

The vehicle side door 10 is described next with reference to an inboard side view thereof. As illustrated in FIG. 2, the door main body 11 includes a door inner panel 21 made of metal and a door outer panel 22 made of metal and disposed on the outboard side of the door inner panel 21. A door trim 23 is provided on an inboard side of the door inner panel 21.

The door trim 23 includes an arm rest 25 bulging from an inner surface 24 in a direction away from the door inner panel 21, an operation switch 26 and an inner handle 27 used for operating a functional component (described in more detail below) disposed inside the door main body 11, and a speaker 28 disposed in the lower front portion of the inner surface 24.

The vehicle side door 10 with the door trim 23 removed is described next. As illustrated in FIG. 3, the door inner panel 21 has a front operation opening 31 and a rear operation opening 32 formed therein. Each of the front operation opening 31 and the rear operation opening 32 communicates with the inside of the door main body 11. A seal portion 33 is formed on the peripheries of the operation openings 31 and 32. The seal portion 33 is used for attaching a hole seal that covers the operation openings 31 and 32.

In addition, the door inner panel 21 has a speaker mounting hole 34 formed therein. The speaker mounting hole 34 is formed to mount the speaker 28 (refer to FIG. 2) ahead of the front operation opening 31. Inside the door main body 11, a window regulator 41, which is one of the functional components, is provided. The window regulator 41 moves the door glass 15 up and down. Note that the functional component is not limited to the window regulator 41. Examples of the functional component include a component that reinforces the function of a door, such as a door latch.

The front operation opening 31 is a substantially inverted triangle in shape. An upper portion of an edge 35 of the front operation opening 31 linearly extends. The rear operation opening 32 is formed so as to have an elongate shape that is inclined to rear. The lower portion of an edge 36 of the rear operation opening 32 substantially linearly extends.

In the door inner panel 21, a first extension portion 37, a second extension portion 38, and a third extension portion 39 extend from the lower rear portion of the seal portion 33 formed on the edge 36 of the rear operation opening 32 toward the rear operation opening 32. The top ends of the first extension portion 37, the second extension portion 38, and the third extension portion 39 are connected together and are integrated into one portion. Since all of the first extension portion 37, the second extension portion 38, and the third extension portion 39 extend from a small area on one side of the seal portion 33, the rear operation opening 32 is not completely covered by the extension portions. Thus, the rear operation opening 32 can have a large effective area.

The connected portion includes a displacement preventing portion 40 that prevents displacement of the door trim 23 (refer to FIG. 2) that is urged toward the door inner panel 21 by a side airbag (described in more detail below). Note that in the connected portion, the top ends of the first extension portion 37, the second extension portion 38, and the third extension portion 39 are not separate, but the top ends of the first extension portion 37, the second extension portion 38, and the third extension portion 39 are integrated into one portion.

Two elongated door beams 52 and 53 are laterally fixed to an inner surface 51 of the door outer panel 22. Both the ends of each of the door beams 52 and 53 are fixed to an inner surface of the door inner panel 21 using fixing members (not illustrated).

A middle portion of the upper door beam 52 in the length direction is connected to the inner surface 51 of the door outer panel 22 by a first connection bracket 61 and a second connection bracket 62 with a seal member (a mastic sealer) interposed therebetween. A middle portion of the lower door beam 53 in the length direction is connected to the inner surface 51 of the door outer panel 22 by a third connection bracket 63 with a seal member (a mastic sealer) interposed therebetween.

The upper door beam 52 is disposed so as to extend along the upper edge 35 of the front operation opening 31. The lower door beam 53 is disposed so as to extend along the lower edge 36 of the rear operation opening 32. Accordingly, the door beams 52 and 53 does not cover the operation openings 31 and 32. Thus, a maintenance operation for the inside of the door main body 11 can be easily performed. Inside the door main body 11, harnesses for the window regulator 41 and harnesses for the outer handle 16 extend.

A vehicle having the vehicle side door 10 according to the present disclosure is described next with reference to a cross-sectional view thereof. As illustrated in FIG. 4, a vehicle 80 has the vehicle side door 10 in the side portion thereof. The lower portion of the vehicle side door 10 is in contact with a side sill 81. A floor panel 83 is provided so as to extend from the side sill 81 to the bottom portion of a compartment 82. A seat 85 on which an occupant 84 is seated is mounted on the floor panel 83. The compartment 82 has a roof 86 in the upper portion. The upper portion of the vehicle side door 10 is in contact with the roof 86.

The seat 85 includes a seat cushion 87, a seat back 88, and a head rest 89. The seat 85 incorporates a side airbag apparatus 90. The side airbag apparatus 90 includes a side airbag 91 (hereinafter simply referred to as a "bag") that is deployed laterally from a side of the seat 85 in the event of vehicle collision. The side airbag apparatus 90 further includes an inflator 92 that is disposed on the outboard side of the seat back 88 and that supplies gas into the bag 91 to inflate the bag 91.

In normal conditions, the bag 91 is folded and stored in the seat back 88. In the event of collision of the vehicle 80, the bag 91 is inflated and deployed between the door trim 23 and the occupant 84 seated on the seat 85.

The door main body 11 includes the door outer panel 22 made of metal and the door inner panel 21 made of metal. The door inner panel 21 is disposed on the inboard side of the door outer panel 22. The door trim 23 is provided on the inboard side of the door inner panel 21. In addition, an impact absorbing member 43 is provided between the door trim 23 and the door inner panel 21. More specifically, the impact absorbing member 43 is disposed inside the arm rest 25. The impact absorbing member 43 is placed at a height that is the same as that of the displacement preventing portion 40 with respect to the height direction of the vehicle.

Figure 5A:
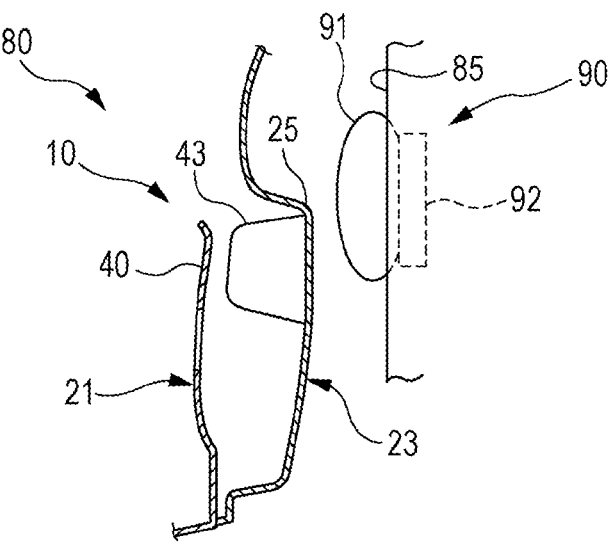
FIGS. 5A to 5C illustrate the operation of the vehicle side door illustrated in FIG. 4.

The operation performed by the vehicle side door 10 is described next. FIG. 5A illustrates the side airbag apparatus 90 immediately after collision of the vehicle 80. Gas is supplied from the inflator 92 to the bag 91, and the bag 91 stored in the seat 85 starts inflating between the seat 85 and the door trim 23.

Figure 5B:
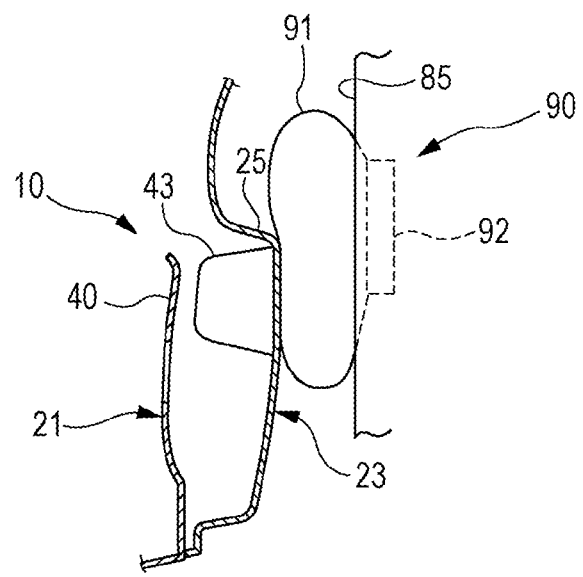

FIG. 5B illustrates the side air bag 91 that is being inflated. The gas is continuously supplied from the inflator 92 to the bag 91. The inflated bag 91 is brought into contact with the door trim 23. The impact absorbing member 43 is located on an outboard side of an initial contact portion of the door trim 23 in the vehicle width direction. The initial contact portion is a portion with which the bag 91 starts to be brought into contact with the door trim 23. In addition, the displacement preventing portion 40 is also located on an outboard side of the initial contact portion of the door trim 23 in the vehicle width direction.

Figure 5C:
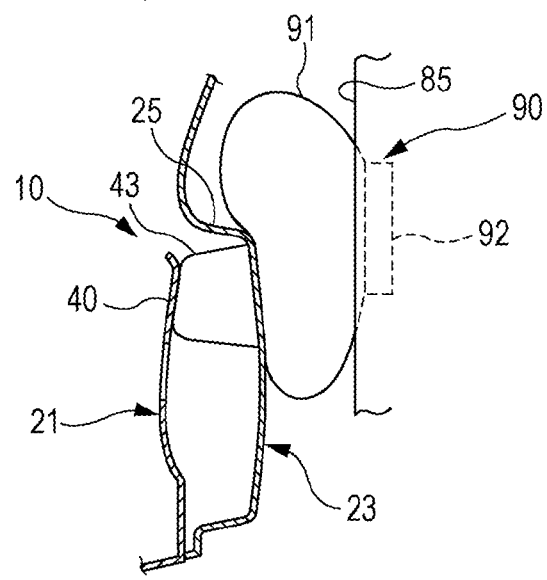

FIG. 5C illustrates the door trim 23 that is pressed. When the bag 91 is inflated, the door trim 23 is urged outwardly in the vehicle width direction and, thus, the door trim 23 is displaced. The impact absorbing member 43 is brought into contact with the displacement preventing portion 40 of the door inner panel 21. Thus, displacement of the door trim 23 is prevented. A gap having a width that is the same as the width of the arm rest 25 is formed between an outboard side of the door trim 23 in the vehicle width direction and the displacement preventing portion 40. By disposing the impact absorbing member 43 in this gap, deformation of the door trim 23 made of plastic can be prevented. By preventing displacement of the door trim 23, outward inflation of the bag 91 in the door thickness direction can be prevented. As a result, the bag 91 is inflated into an optimum deployment shape.

The position of the displacement preventing portion 40 is described next with reference to a lateral cross-sectional view. As illustrated in FIG. 6, the arm rest 25, the impact absorbing member 43, and the displacement preventing portion 40 are located on an outboard side of the side airbag apparatus 90 in the vehicle width direction. Note that the arm rest 25 forms the door trim 23. Accordingly, when the bag 91 is inflated, the displacement preventing portion 40 can receive a pressing force exerted from the bag 91 to the door trim 23. In addition, although the length of the displacement preventing portion 40 in the front-rear direction of the vehicle is relatively smaller, the length of the impact absorbing member 43 in the front-rear direction of the vehicle is larger. Accordingly, deformation of the door trim 23 can be prevented throughout the length in the front-rear direction of the vehicle. As a result, the bag 91 can be inflated into an optimum deployment shape in the front-rear direction of the vehicle.

Figure 7:
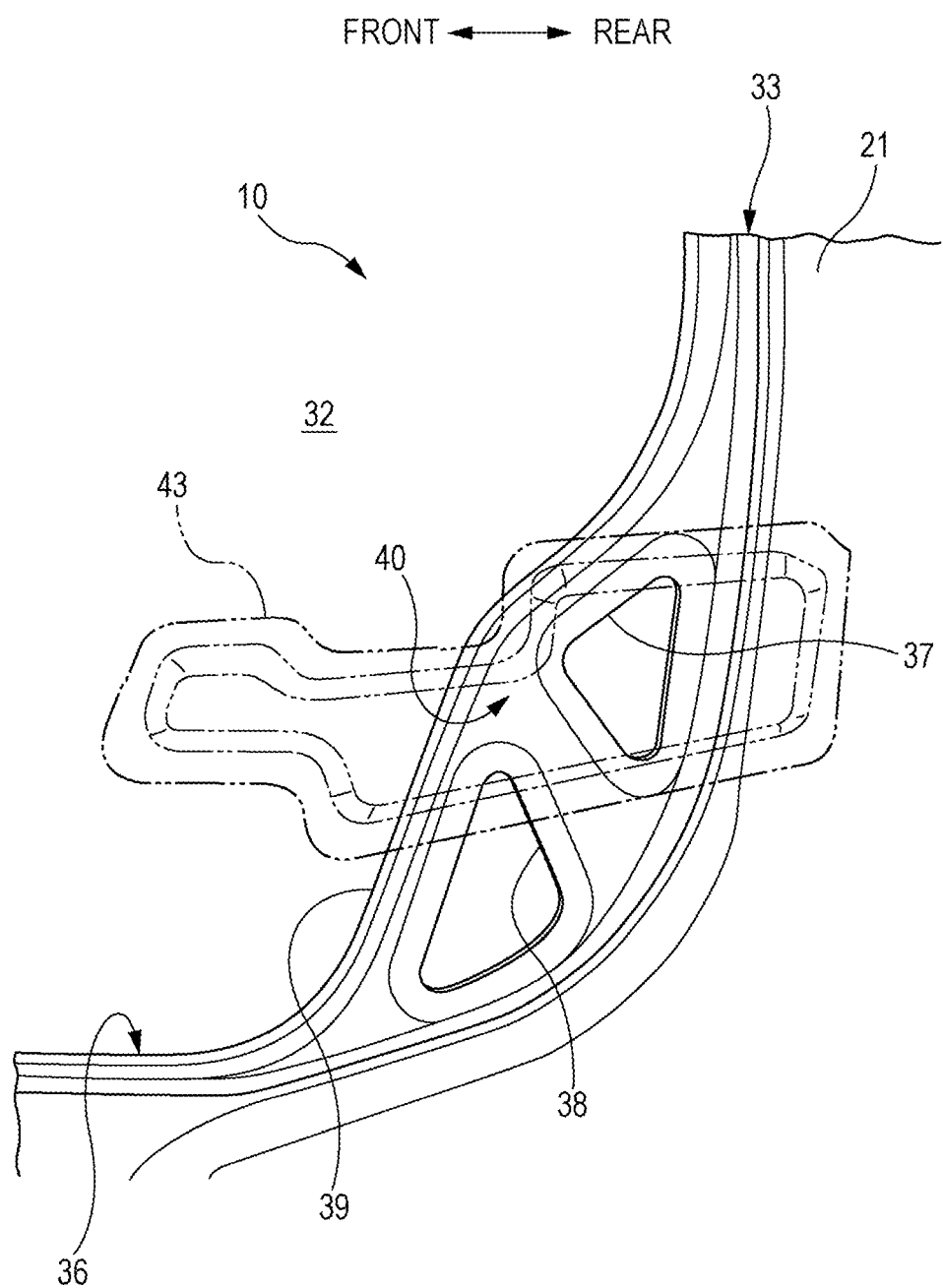
FIG. 7 is a side view of a main part of the vehicle side door illustrated in FIG. 3.

The positional relationship between the displacement preventing portion 40 and the impact absorbing member 43 in the door thickness direction is described next. As illustrated in FIG. 7, the first extension portion 37, the second extension portion 38, and the third extension portion 39 extend from the seal portion 33 of the door inner panel 21 toward the rear operation opening 32. The top ends of the first extension portion 37, the second extension portion 38, and the third extension portion 39 are connected together and are integrated into one portion. The displacement preventing portion 40 is located in the integrated portion. In addition, the impact absorbing member 43 extends in the front-rear direction of the vehicle, and the position of the impact absorbing member 43 partially overlaps the displacement preventing portion 40 when viewed from the door thickness direction. Accordingly, the displacement preventing portion 40 can receive straight a force received by the impact absorbing member 43 when the bag 91 (refer to FIG. 4) is inflated.

Figure 8:
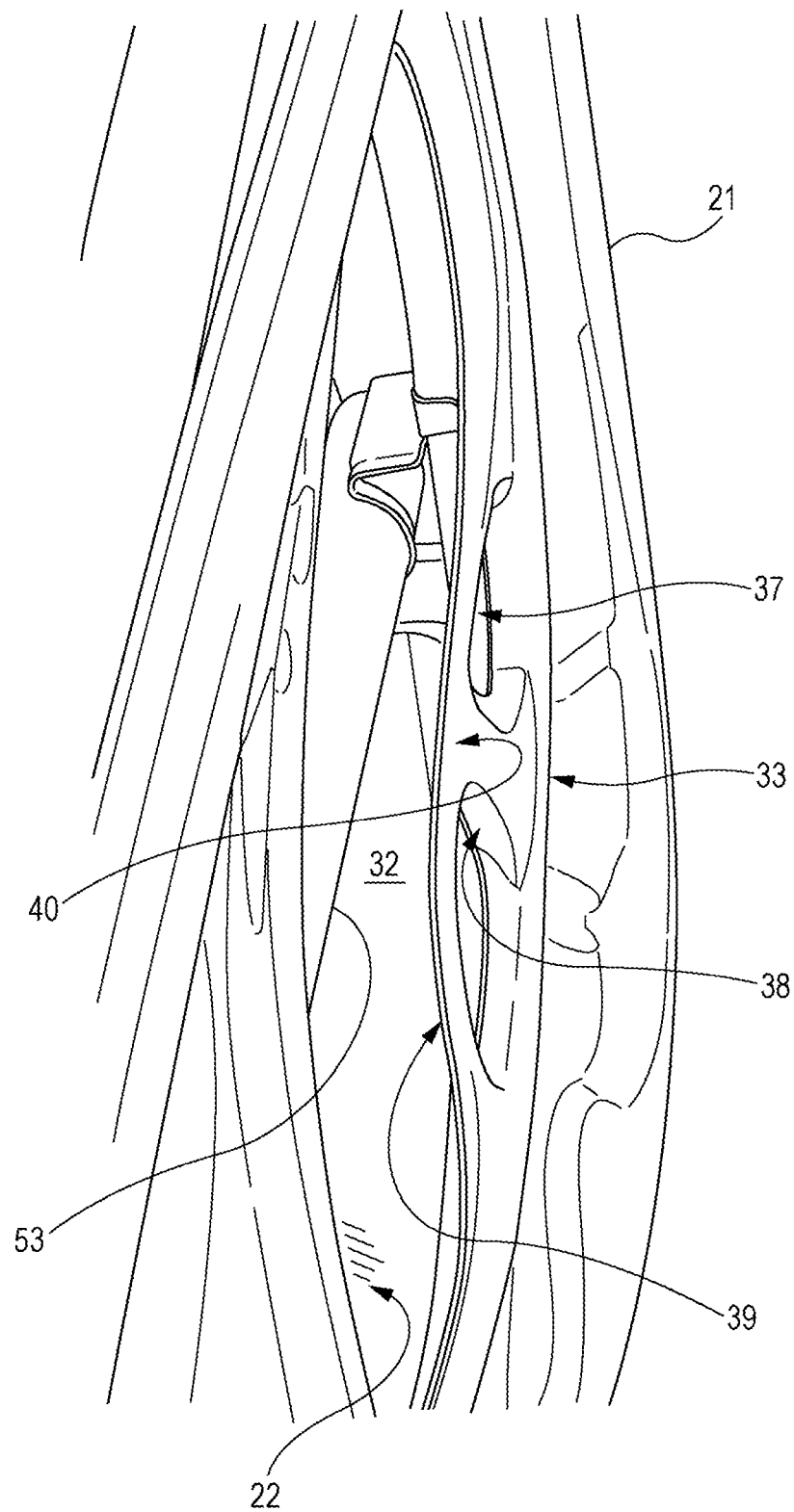
FIG. 8 is a perspective view of the main part of the vehicle side door illustrated in FIG. 3.

The positions of base ends of the first extension portion 37, the second extension portion 38, and the third extension portion 39 are described next. As illustrated in FIG. 8, the seal portion 33 of the rear operation opening 32 is formed in a plane of the door inner panel 21. The base ends of the first extension portion 37, the second extension portion 38, and the third extension portion 39 are located along the seal portion 33 at intervals. The base ends of the first extension portion 37, the second extension portion 38, and the third extension portion 39 are not arranged on a straight line. In addition, the first extension portion 37, the second extension portion 38, and the third extension portion 39 are formed so as to gradually slope toward the door outer panel 22 as they extend from the seal portion 33 toward the rear operation opening 32. A sheet seal member (a hole seal) provided in the seal portion 33 may vibrate. However, since the first extension portion 37, the second extension portion 38, and the third extension portion 39 are located at positions distant from the seal member, the first extension portion 37, the second extension portion 38, and the third extension portion 39 are not in contact with the seal member.

As illustrated in FIG. 9, the height of the base end of the first extension portion 37 with respect to the seal portion 33 in the door thickness direction is denoted as H1. The height of the base end of the second extension portion 38 with respect to the seal portion 33 in the door thickness direction is denoted as H2. The height of the base end of the third extension portion 39 from the seal portion 33 in the door thickness direction is denoted as H3. These heights satisfy the relationship of H2<H1<H3. By setting the height H1, H2, and H3 to different values in the door thickness direction in this manner, the rotation centers of the bending moments of the first extension portion 37, the second extension portion 38, and the third extension portion 39 can be made different when a load is applied to the displacement preventing portion 40 (refer to FIG. 8) urging outwardly in the vehicle width direction. In this manner, the first extension portion 37, the second extension portion 38, and the third extension portion 39 may be resistant to deformation from the rotation centers of the bending moments thereof.

Note that the relationship among the heights is not limited to "H2<H1<H3". For example, the relationship "H3<H1<H2" can be employed. Any relationship in which the height H1, H2, and H3 differ from one another can be employed. Furthermore, one or any two of the height H1, H2, and H3 can be zero.

In addition, since each of the first extension portion 37, the second extension portion 38, and the third extension portion 39 has a U shape in cross-section, the rigidity thereof can be increased. As a result, even when a large load is applied to the displacement preventing portion 40 by the bag 91 (refer to FIG. 4) in the event of a side impact collision, the displacement preventing portion 40 can be resistant to deformation.

The structure of the above-described vehicle side door 10 is summarized below. As illustrated in FIG. 4 and FIGS. 5A to 5C, the door inner panel 21 includes the displacement preventing portion 40 that prevents displacement of the door trim 23 toward the door inner panel 21. The position of the displacement preventing portion 40 is set to a point at which the side airbag 91 that is deployed between the door trim 23 and the occupant 84 seated on the seat 85 in the compartment 82 starts contacting the door trim 23. Accordingly, displacement of the door trim 23 can be prevented by the displacement preventing portion 40 and, thus, the side airbag 91 can be inflated into an optimum deployment shape.

As illustrated in FIGS. 3 and 7, the seal portion 33 is formed at the edge of the operation opening 32 of the door inner panel 21, and the door inner panel 21 has at least one of the first extension portion 37, the second extension portion 38, and the third extension portion 39 each extending from the seal portion 33 toward the rear operation opening 32. The first extension portion 37, the second extension portion 38, and the third extension portion 39 that extend from the seal portion 33 which serves as a limit line when the size of the operation opening 32 is maximized toward the operation opening 32 are provided. In addition, the displacement preventing portion 40 is provided in each of the first extension portion 37, the second extension portion 38, and the third extension portion 39. Accordingly, the displacement preventing portion 40 can be provided while ensuring a maximized size of the operation opening 32.

As illustrated in FIG. 8, in order to cover the operation opening 32, a sheet seal member is bonded to the seal portion 33. The first extension portion 37, the second extension portion 38, the third extension portion 39 slope toward the door outer panel 22 as they extend from the seal portion 33 toward the operation opening 32. Accordingly, the first extension portion 37, the second extension portion 38, the third extension portion 39 move further away from the seal member as they extend from the seal portion 33 toward the operation opening 32. Thus, interference of the first extension portion 37, the second extension portion 38, and the third extension portion 39 with the seal member can be prevented.

As illustrated in FIG. 7, the displacement preventing portion 40 is located in the connection portion formed by connecting the top ends of the first extension portion 37, the second extension portion 38, the third extension portion 39 together. Accordingly, the rigidity of the displacement preventing portion 40 can be increased. As a result, displacement of the door trim 23 (refer to FIGS. 5A to 5C) can be prevented. In addition, the plurality of extension portions 37, 38, and 39 are provided. Thus, the width of each of the extension portions 37, 38, and 39 can be reduced while maintaining a predetermined rigidity of the displacement preventing portion 40. As a result, the weight of each of the extension portions 37, 38, and 39 can be reduced and, therefore, the weight of the door inner panel 21 can be reduced.

As illustrated in FIGS. 8 and 9, if the side air bag 91 (refer to FIGS. 5A to 5C) is inflated and deployed and, thus, the side air bag 91 is brought into contact with the door trim 23, the load is applied to the displacement preventing portion 40 located in the top ends of the extension portions 37, 38, and 39 urging outwardly in the vehicle width direction. At that time, a bending moment about the connection portion between the seal portion 33 and each of the extension portions 37, 38, and 39 is generated in the extension portions 37, 38, and 39. Since the base ends of the extension portions 37, 38, and 39 are located at the different heights H1, H2, and H3 from the seal portion 33 in the door thickness direction, the rotation centers of the bending moments of the extension portions 37, 38, and 39 can be made different from one another. Thus, the extension portions 37, 38, and 39 may be resistant to deformation from the rotation centers of the bending moments of the extension portions 37, 38, and 39.

As illustrated in FIGS. 5A to 5C and 7, the impact absorbing member 43 is disposed in a gap formed between the door inner panel 21 and the door trim 23 and, thus, the gap is filled with the impact absorbing member 43. The position of the impact absorbing member 43 is determined so as to at least partially overlap the displacement preventing portion 40 when viewed from the door thickness direction. If the side air bag 91 is brought into contact with the door trim 23, the door trim 23 can be immediately supported by the displacement preventing portion 40 via the impact absorbing member 43. As a result, deformation of the door trim 23 is reduced and, therefore, the side air bag 91 can be inflated and deployed into an optimum shape.

As illustrated in FIG. 4, the door trim 23 includes the arm rest 25 that bulges from the inboard surface 24 in a direction away from the door inner panel 21. Since the arm rest 25 contains the impact absorbing member 43, deformation of the arm rest 25 that receives a pressing force from the side air bag 91 being inflated and deployed can be prevented. As a result, the side air bag 91 can be more effectively inflated and deployed into an optimum shape.

While some specific examples and embodiments are described above, it will be clear that the present disclosure is not limited to these specific examples and embodiments and that many changes and modified embodiments will be obvious to those skilled in the art. For example, while the present exemplary embodiment has been described with reference to three extension portions (the extension portions 37, 38, and 39), the number of the extension portions is not limited thereto. For example, one extension portion or four extension portions may be provided. If a plurality of extension portions are provided, the top ends of the extension portions are connected together and are integrated into one portion.

The technology described in the present disclosure is suitable for a vehicle side door used for vehicles including a side airbag apparatus.

We claim:

1. A vehicle side door mounted on a side of a vehicle comprising:
    a door main body including a door inner panel and a door outer panel; and
    a door trim provided to the door inner panel on an inboard side of the door inner panel,
    wherein the door inner panel includes a displacement preventing portion preventing displacement of the door trim toward the door inner panel,
    wherein the door trim includes an initial contact portion initially contacting a side airbag deployed between the door trim and an occupant seated in a compartment,
    wherein the displacement preventing portion is set at a position corresponding to the initial contact portion in a door thickness direction of the vehicle side door,
    wherein the side airbag is disposed in a seat and is deployed from the seat toward the door trim along the door thickness direction,
    wherein the door inner panel further includes:
    an operation through hole for allowing a functional component disposed inside the door main body to undergo external service operation,
    a seal portion formed at an edge of the through hole for attaching thereto a hole seal for covering the through hole, and
    an extension portion extending from the seal portion toward the through hole,
    wherein the displacement preventing portion is provided in the extension portion, and
    wherein the door inner panel includes two or more of the extension portion, respective top ends of the extension portions being connected together to form a connection portion, and the displacement preventing portion is provided in the connection portion.

2. The vehicle side door according to claim 1, wherein the respective extension portions slope toward the door outer panel along an extension direction of the respective extension portions from the seal portion toward the through hole.

3. The vehicle side door according to claim 1, wherein the displacement preventing portion is disposed behind the initial contact portion.

4. The vehicle side door according to claim 1, wherein the initial contact portion protrudes toward the inside of the compartment.

5. The vehicle side door according to claim 1, wherein the extension portions include respective base ends opposite to the respective top ends, the respective base ends are located at different positions from each other in the door thickness direction.

6. The vehicle side door according to claim 5, wherein the respective base ends are recessed back from the seal portion toward the door outer panel in the door thickness direction.

7. The vehicle side door according to claim 1, further comprising:
    an impact absorbing member disposed between the door inner panel and the door trim,
    wherein the impact absorbing member is positioned so as to at least partially overlap the displacement preventing portion in the door thickness direction.

8. The vehicle side door according to claim 7, wherein the door trim includes an arm rest bulging out from an inboard side of the door trim in a direction away from the door inner panel, and the impact absorbing member is disposed inside the arm rest.

9. The vehicle side door according to claim 7, wherein the impact absorbing member is elongate in a longitudinal direction of the vehicle, and a longitudinal length of the impact absorbing member is larger than a longitudinal length of the displacement preventing portion.

10. A vehicle side door mounted on a side of a vehicle comprising:
    a door main body including a door inner panel and a door outer panel; and
    a door trim provided to the door inner panel on an inboard side of the door inner panel,
    wherein the door inner panel includes a displacement preventing portion preventing displacement of the door trim toward the door inner panel,
    wherein the door trim includes an initial contact portion initially contacting a side airbag deployed between the door trim and an occupant seated in a compartment,
    wherein the displacement preventing portion is set at a position corresponding to the initial contact portion in a door thickness direction of the vehicle side door,
    wherein the side airbag is disposed in a seat and is deployed from the seat toward the door trim along the door thickness direction, and
    wherein the side airbag includes a bag and an inflator supplying a gas to the bag to inflate the bag, and the inflator at least partially overlaps the displacement preventing portion in the door thickness direction.

11. The vehicle side door according to claim 10, further comprising:
    an impact absorbing member disposed between the door inner panel and the door trim,
    wherein the impact absorbing member is positioned so as to at least partially overlap the displacement preventing portion in the door thickness direction, and
    wherein the inflator, the impact absorbing member, and the displacement preventing portion are at least partially overlapped with each other in the door thickness direction.

12. A vehicle side door mounted on a side of a vehicle comprising:
- a door main body including a door inner panel and a door outer panel; and
- a door trim provided to the door inner panel on an inboard side of the door inner panel,
- wherein the door inner panel includes a displacement preventing portion preventing displacement of the door trim toward the door inner panel,
- wherein the door trim includes an initial contact portion initially contacting a side airbag deployed between the door trim and an occupant seated in a compartment,
- wherein the displacement preventing portion is set at a position corresponding to the initial contact portion,
- wherein the door inner panel includes:
  - an operation through hole for allowing a functional component disposed inside the door main body to undergo external service operation,
  - a seal portion formed at an edge of the through hole for attaching thereto a hole seal for covering the through hole, and
  - an extension portion extending from the seal portion toward the through hole,
- wherein the displacement preventing portion is provided in the extension portion, and
- wherein the door inner panel includes two or more of the extension portion, respective top ends of the extension portions being connected together to form a connection portion, and the displacement preventing portion is provided in the connection portion.

13. The vehicle side door according to claim 12, wherein the extension portions include respective base ends opposite to the respective top ends, the respective base ends are located at different positions from each other in a door thickness direction.

14. The vehicle side door according to claim 13, wherein the respective base ends are recessed back from the seal portion toward the door outer panel in the door thickness direction.

15. A vehicle side door mounted on a side of a vehicle comprising:
- a door main body including a door inner panel and a door outer panel;
- a door trim provided to the door inner panel on an inboard side of the door inner panel; and
- an impact absorbing member disposed between the door inner panel and the door trim,
- wherein the door inner panel includes a displacement preventing portion preventing displacement of the door trim toward the door inner panel,
- wherein the door trim includes an initial contact portion initially contacting a side airbag deployed between the door trim and an occupant seated in a compartment,
- wherein the displacement preventing portion is set at a position corresponding to the initial contact portion,
- wherein the impact absorbing member is positioned so as to at least partially overlap the displacement preventing portion in a door thickness direction, and
- wherein the impact absorbing member is elongate in a longitudinal direction of the vehicle, and a longitudinal length of the impact absorbing member is larger than a longitudinal length of the displacement preventing portion.

* * * * *